United States Patent [19]
Lechleiter et al.

[11] Patent Number: 5,882,158
[45] Date of Patent: Mar. 16, 1999

[54] DRIVE ASSEMBLY

[75] Inventors: Karl Lechleiter, Oy-Mittelberg; Alfred Geissler, Pfronten, both of Germany

[73] Assignee: Deckel Maho GmbH, Pfronten, Germany

[21] Appl. No.: 866,878

[22] Filed: May 30, 1997

[30] Foreign Application Priority Data

May 31, 1996 [DE] Germany .................. 196 22 060.2
Oct. 29, 1996 [EP] European Pat. Off. .............. 96117359

[51] Int. Cl.$^6$ ...................................................... B23C 1/12
[52] U.S. Cl. ........................ 409/146; 74/409; 408/89; 408/236; 409/168; 409/201; 409/221; 409/235
[58] Field of Search .............................. 74/409; 409/146, 409/168, 185, 198, 201, 211, 216, 221, 235, 241; 408/88, 89, 90, 91, 234, 236

[56] References Cited

U.S. PATENT DOCUMENTS

| | | | |
|---|---|---|---|
| 2,708,861 | 5/1955 | Walter | 409/221 |
| 3,316,772 | 5/1967 | Jones | 74/409 |
| 3,621,753 | 11/1971 | Gladoske | 409/235 |
| 3,665,482 | 5/1972 | Cresswell | 74/409 |
| 3,772,961 | 11/1973 | Siebert | 409/221 |
| 3,998,127 | 12/1976 | Romeu | 409/235 |
| 5,085,619 | 2/1992 | Torii et al. | 74/409 |
| 5,157,822 | 10/1992 | Farley | 409/241 |

FOREIGN PATENT DOCUMENTS

| | | |
|---|---|---|
| 2925833 | 1/1981 | Germany . |
| 3704787 | 8/1988 | Germany . |

*Primary Examiner*—Daniel W. Howell
*Attorney, Agent, or Firm*—Baker & Maxham

[57] ABSTRACT

The invention concerns a drive assembly for relative movement of two components of a machine tool with a drive motor and a gear arrangement with two gear trains that can be put under tension relative to each other and have output gears that mesh with opposing teeth, where each gear train has a compact gear with a high transmission ratio with at least one control element for applying tension to the two gear trains. A high positioning accuracy and torsional rigidity combined with a small size when installed are made possible according to this invention by the fact that the compact gear.

10 Claims, 7 Drawing Sheets

DRIVE ASSEMBLY

BACKGROUND OF THE INVENTION

1. Field of the Invention

This invention generally concerns a drive assembly, and more particularly relates to the relative movement of two components of a machine tool, with a drive motor and a gear arrangement with two gear trains that can be put under tension relative to each other.

2. Description of the Related Art

A drive assembly of the general type of this invention is known from German patent 3,704,787, where the torque is transmitted from a drive motor over a pinion to two gear wheels that mesh with it. These gear wheels are each attached to an input shaft of two standard gears with a high step-up or step-down transmission ratio and thus they are each connected over free-wheeling mechanisms that act in opposite directions. The torque is transmitted from the output shafts of the standard gears with attached gear wheels to a gear wheel connected to the output shaft.

SUMMARY OF THE INVENTION

A primary purpose of this invention is to create a drive assembly with a gear that can easily be put under tension and requires little installation space while having a high rigidity and positioning accuracy.

Cycloid gears are used as compact gears with a high transmission ratio in the drive assembly according to this invention. They are characterized by a low-friction power transmission and a high transmission ratio in an extremely small space. Cycloid gears also have a high torsional strength and permit adjustment without play to achieve a high positioning accuracy. The control elements for applying tension to the two gear trains are designed as detachable adapter sleeves for a friction-locked connection between the driving pinions and the drive shafts of the cycloid gears. With the help of these adapter sleeves, a simple bracing of the two gear trains can be achieved by the fact that after the initial stress on the toothed belt, the adapter sleeves are first released to release the friction-locked connection between the driving pinions and the drive shafts of the cycloid gears. Then the two drive shafts are rotated in opposite directions while the driving pinions remain stationary until the teeth of the two output gears come in contact with the opposing flanks of the teeth on the component to be driven. In this position, the adapter sleeves are tightened again and the two gear trains are kept in the mutually braced position.

To facilitate the mutual turning of the two drive shafts of the cycloid gears for bracing the two gear trains, receptacle elements for insertion of appropriate turning tools are preferably provided on the drive shafts. These receptacle elements may be, for example, Allen screws that are screwed into the end face of the drive shaft so that the drive shafts can be rotated in opposite directions relative to each other with appropriate tools.

The angular position of the component to be driven can preferably be detected by a rotary position transducer that permits a high accuracy in a small space.

Because of its high positioning accuracy and rigidity, the drive assembly according to this invention is especially suitable as a drive for rotary table systems or swivel milling heads of machine tools. Other possible uses would include all situations where a drive with a high transmission ratio but without play is required for a small space. For example, the drive assembly can also be used in combination with a gear rack for conversion to a translational movement, for example, as the drive for a table or support. Here again, an especially rigid and low-friction drive with a high positioning accuracy can be achieved. To achieve greater traversing movements, the drive motor and the two cycloid gears are preferably arranged in the component to be traversed while the gear rack is arranged on the stationary component. However, the opposite arrangement is also possible, especially when the distance traversed is small.

BRIEF DESCRIPTION OF THE DRAWING

The objects, features and advantages of this invention will be more readily apparent from the following detailed description, when read in conjunction with the accompanying drawing figures, in which.

DETAILED DESCRIPTION OF THE PREFERRED EMBODIMENTS

Figure 1:
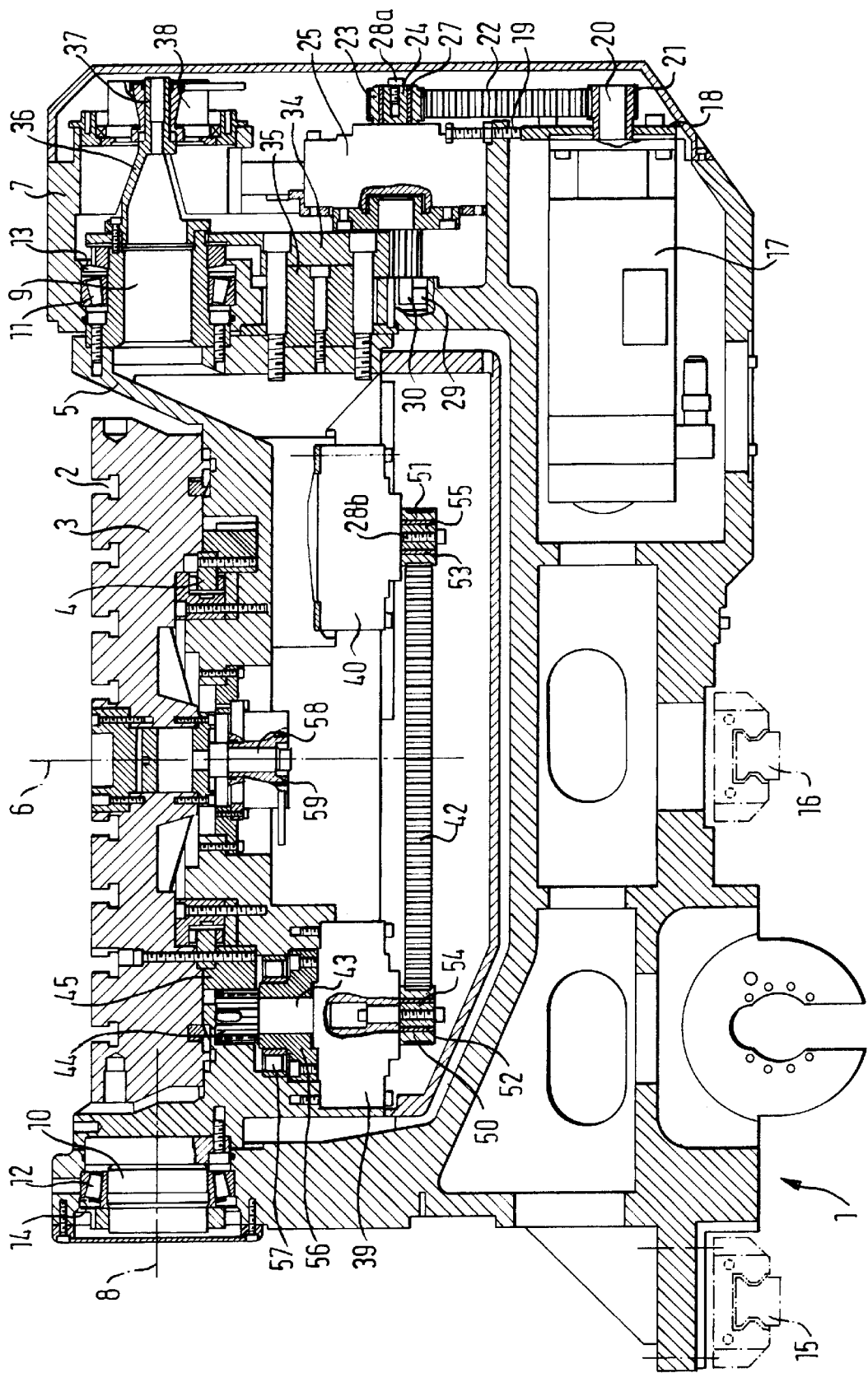
FIG. 1 shows a cross-section through a swiveling turntable of a machine tool with the drive assembly according to the present invention.
Figure 2:
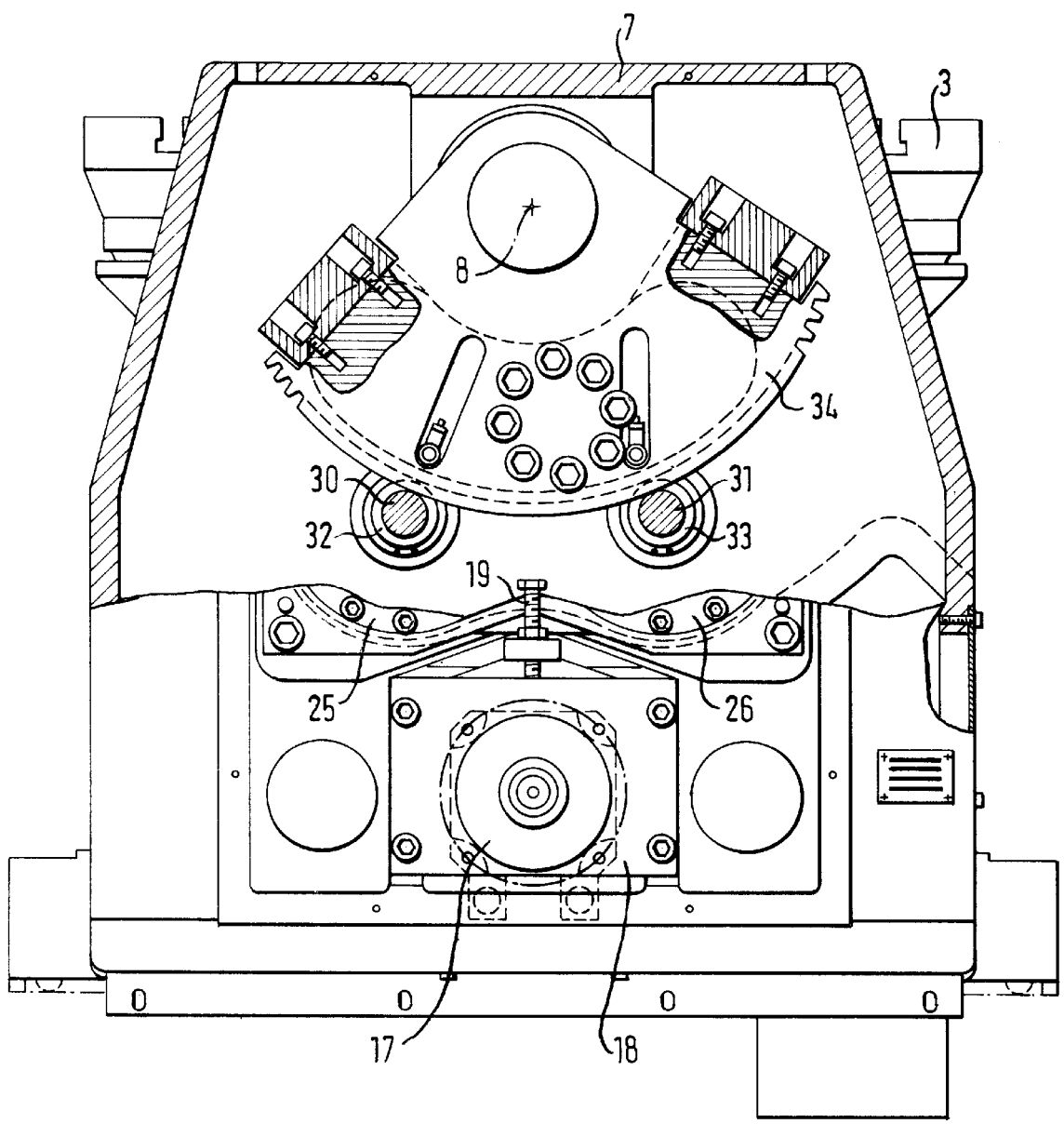
FIG. 2 is a partially cutaway side view of the swiveling turntable from FIG. 1.
Figure 3:
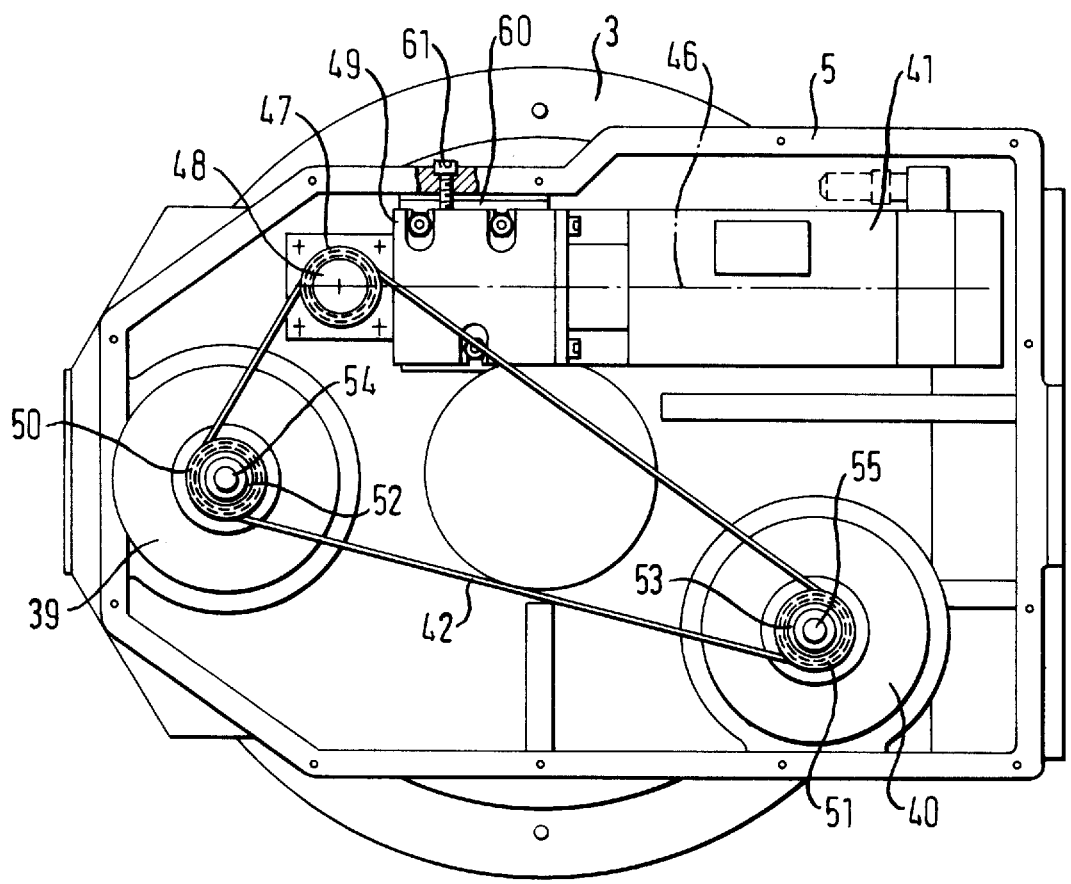
FIG. 3 is a bottom view of the drive assembly for the table top of the swiveling turntable illustrated in FIG. 1.

Swiveling turntable 1 of a machine tool as illustrated in FIGS. 1 to 3 includes round table top 3 that is provided with chucking grooves 2 and is mounted so it can rotate about vertical axis 6 by means of roller bearing mount 4 with a combination of two braced axial roller bearings and one radial roller bearing in case 5. Case 5 can be pivoted about horizontal axis 8 inside supporting frame 7 (see FIG. 2). Therefore, two opposite side axle journals 9 and 10 are attached to case 5 and are mounted in side bearing bores 13 and 14 of supporting frame 7 by means of two tapered roller bearings 11 and 12 that can be braced with respect to each other. Supporting frame 7 is arranged so it can be motor driven on a stand of the machine tool by means of parallel guide rails 15 and 16 (shown with dotted lines) on its lower side and a ball-and-screw spindle drive.

The swiveling of case 5 inside supporting frame 7 and thus also the swiveling of table top 3 about horizontal axis 8 are accomplished by variable speed drive motor 17 that is adjustably mounted on supporting frame 7 by motor mount 18 with tension screw 19. Pulley 21 for toothed belt 22 is attached so it can rotate on output shaft 20 of drive motor 17. In addition to driving pinion 23 illustrated in FIG. 1 on drive shaft 24 of first cycloid gear 25, another driving pinion is also driven at the same time on the drive shaft of second cycloid gear 26 illustrated in FIG. 2 by means of toothed belt 22. The two driving pinions are each frictionally secured by means of spring collet 27 that can be released on the drive shafts of respective cycloid gears 25 and 26. Set screws 28a are screwed into the end faces of the two drive shafts. One output gear 32 or 33, each of which engages with gear wheel segment 34, sits on output shafts 30 and 31 of cycloid gears 25 and 26 that are mounted so they can rotate in supporting frame 7 by means of roller bearings 29, as illustrated in FIG. 1. Gear wheel segment 34 is arranged concentrically with horizontal axis 8 below tapered roller bearing 11 by means of spacer 35 on the side wall of case 5 (on the right in FIG. 1). Table top 3 can be pivoted about horizontal axis 8 by means of drive motor 17 and the two cycloid gears 25 and 26 and gear wheel segment 34.

To detect a certain swivel position of table top 3, shoulder 36 is flange-mounted on journal 9 (at the upper right in FIG. 1) and its free cylindrical end part 37 is arranged with torsional strength in a hollow shaft of rotary position transducer 38. The swivel position of table top 3 can be determined accurately with the help of this rotary position transducer.

According to FIG. 1, the rotational drive of table top 3 is achieved by means of two cycloid gears 39 and 40 that are mounted below table top 3 on case 5 and are driven jointly by drive motor 41 (illustrated in FIG. 3) and toothed belt 42. Cycloid gears 39 and 40 are arranged in such a way that output gears 44 sitting on output shafts 43 are jointly engaged with an annular gear 45 attached to the bottom side of table top 3 so it is concentric with its axis of rotation 6. In contrast with drive motor 17 whose output shaft 20 runs parallel to the drive shafts of the corresponding cycloid gear, drive motor 41 is attached to case 5 below table top 3 with motor shaft 46 offset by 90° with respect to drive shafts of cycloid gears 39 and 40. Belt pulley 47 for toothed belt 42 therefore sits on output shaft 48 of right-angle gear 49 that is flange-mounted on drive motor 41 and is deflected by 90° by the rotational movement of drive motor 41. Driving pinions 50 and 51 are also frictionally secured on drive shafts 54 and 55 of cycloid gears 39 and 40 by way of adaptor sleeves or clamping sleeves 52 and 53 that can be released. Set screws 28*b* are screwed into the end faces of the two drive shafts 54 and 55. Output shafts 43 are each rotationally secured in receptacle 56 that is mounted in case 5 so it can rotate by means of roller bearings 57.

To determine the rotational position of table top 3, bolt 58, which is coaxial with axis of rotation 6, is mounted on bottom side of the table top and sits with torsional strength in the hollow shaft of rotary position transducer 59.

According to FIG. 3, drive motor 41 and right-angle gear 49 are attached to mount 60 that is adjustable by tension screw 61 for prestressing toothed belt 42.

The design and function principle of the cycloid gears is explained below with reference to FIG. 4 which shows a sectional diagram of one of the two cycloid gears used for the rotational drive of table top 3. Cycloid gear 39 has cam plate 62 that is rotationally connected to its drive shaft 54 and drives three mutually offset cams 64 over roller bearings 63. Cams 64 have an exterior profile in the form of a closed cycloid train and they roll along the inside periphery of stationary pin ring 65 due to the rotation of cam plate 62. Cams 64 are provided with a circular arrangement of boreholes 66 in which are engaged driving pins 68 that are arranged in a circle on driving plate 67. Each cam 64 has at least one cam section less than there are pins 69 in pin ring 65. When cams 64 are advanced clockwise within pin ring 65 by the rotation of cam plate 62, they are at the same time rotating counterclockwise about their own axis. This results in a rotational movement with a much lower speed in the opposite direction. With a complete revolution of cam plate 62, each cam 64 advances by one cam section. The reduced rotational motion of cams 64 is transmitted to driving plate 67 by driving pins 68. Receptacle 56 in which output shaft 43 is secured rotationally is bolted to driving plate 67. Output gear 44 is secured on output shaft 43 in such a way that it is locked against rotation. Driving pinion 51 is frictionally secured on drive shaft 54 by adapter sleeve 53. Adapter sleeve 53 has a meandering element 70 made of spring steel that is widened radially inward and outward by applying axial pretension through screws 71, thus forming a frictionally secured connection between drive shaft 54 and driving pinion 51.

The application of tension of the two gear trains to achieve an adjustment of the drive assemblies free of play is explained below on the basis of the rotational drive for table top 3. First, toothed belt 42 is put under tension by adjusting set screw 61. Then adapter sleeves 53 between drive shafts 54 and 55 of cycloid gears 39 and 40 and driving pinions 50 and 51 are released and drive shafts 54 and 55 are rotated toward each other with the help of set screws 28*b* until the flanks of the teeth on output gears 44 that are arranged on output shafts 43 are in contact with the opposite flanks of the teeth on annular gear 45. Then the adapter sleeves are tightened again to retain the tension. The swivel drive can also be adjusted without any play by the same method.

Figure 5:
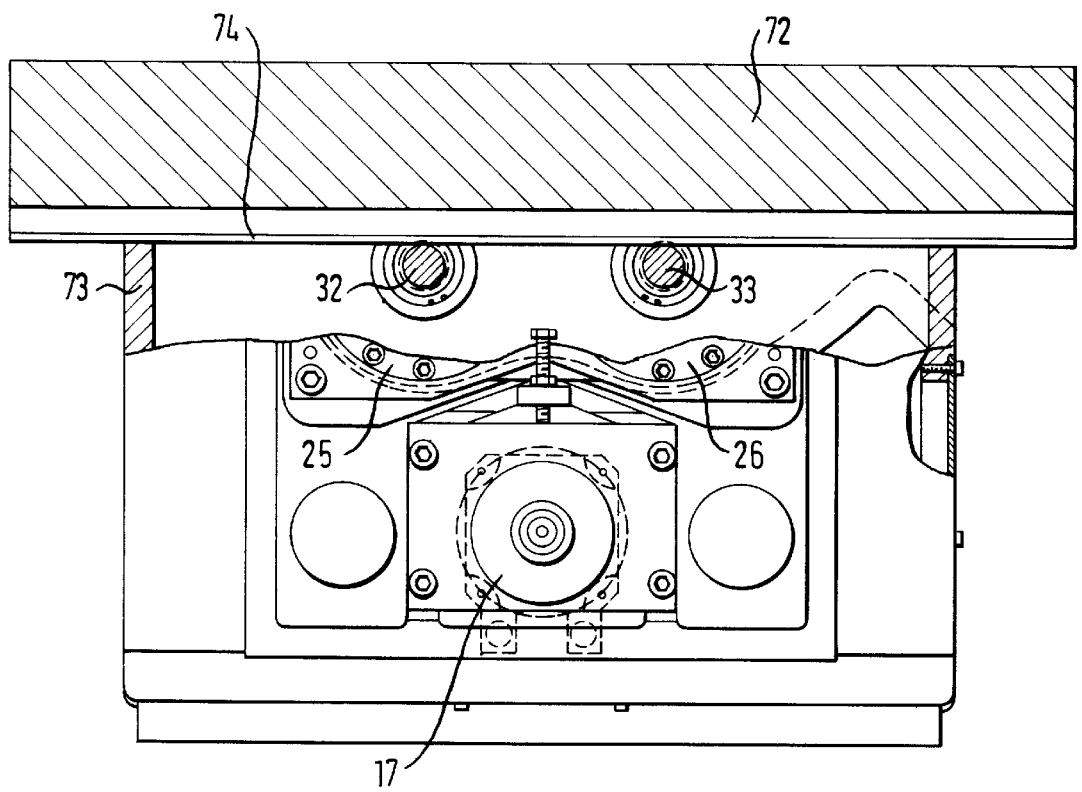
FIG. 5 is a partially cutaway side view of an example of installation of the drive assembly according to this invention for translational movement of a machine part.

FIG. 5 illustrates another embodiment of this invention, where the drive assembly is used for translational movement of a machine part 73, such as a carriage, a moving stand, a console, etc., that is displaceably mounted on stationary part 72 such as a machine bed or a stationary stand. The drive is designed essentially as illustrated in FIGS. 1 and 2 for swiveling table top 3 about axis 8, where the same notation is used for the corresponding parts. Again in this embodiment, cycloid gears 25 and 26 are driven by drive motor 17 with a belt. However, in contrast with the embodiment according to FIG. 2, drive motor 17 and cycloid gears 25 and 26 are installed in machine part 73 to be moved. The two output gears 32 and 33 engage with gear rack 74 arranged on stationary component 72. Thus, machine part 73 can be moved relative to component 72 by rotating drive motor 17. Again in this embodiment, an especially low-friction forward feed drive that has a high rigidity and is free of play due to the applied tension can be achieved.

Figure 6:
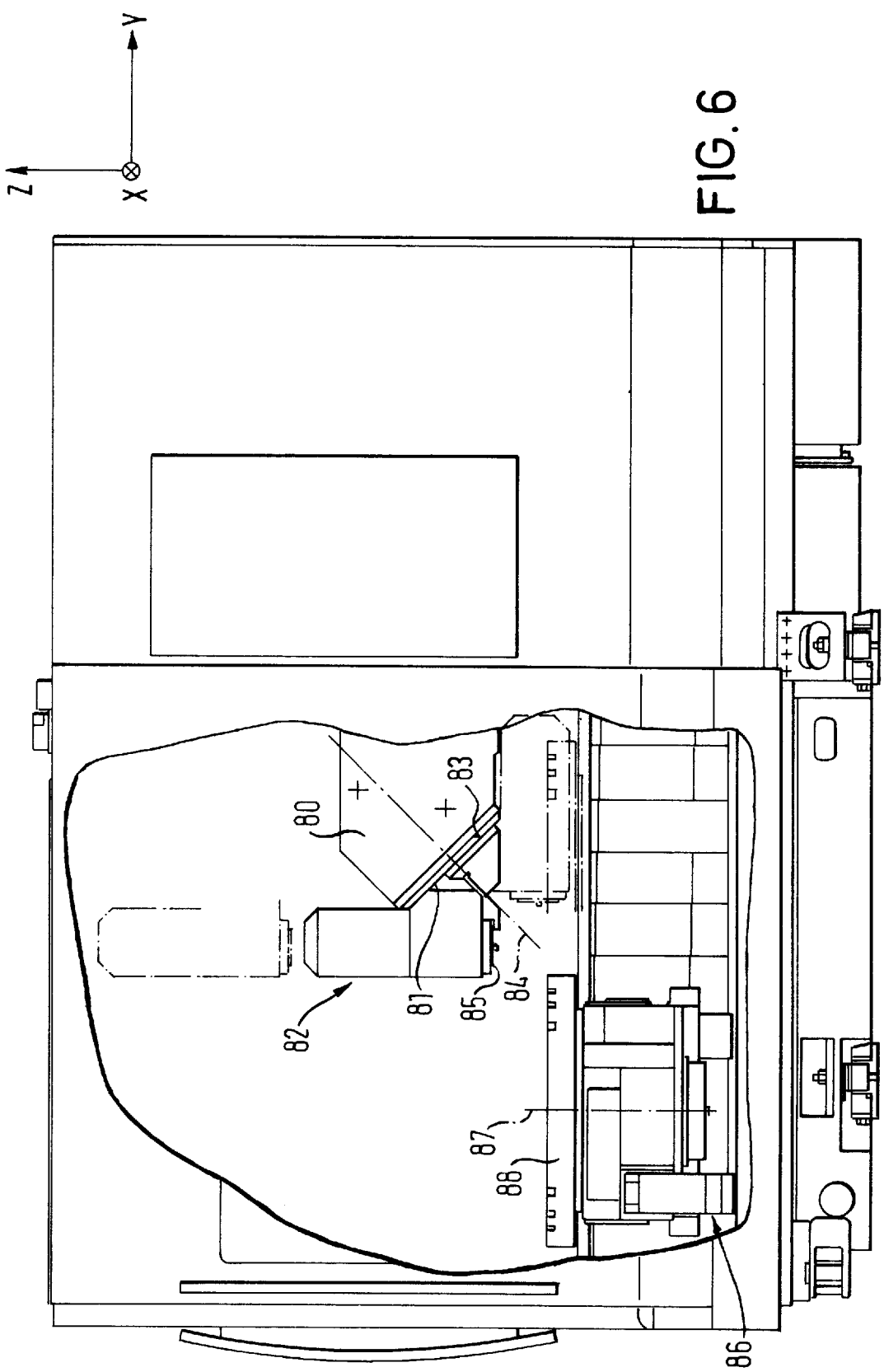
FIG. 6 is a side view of a universal combined milling and boring machine of the invention with a partially cutaway side wall.
Figure 7:
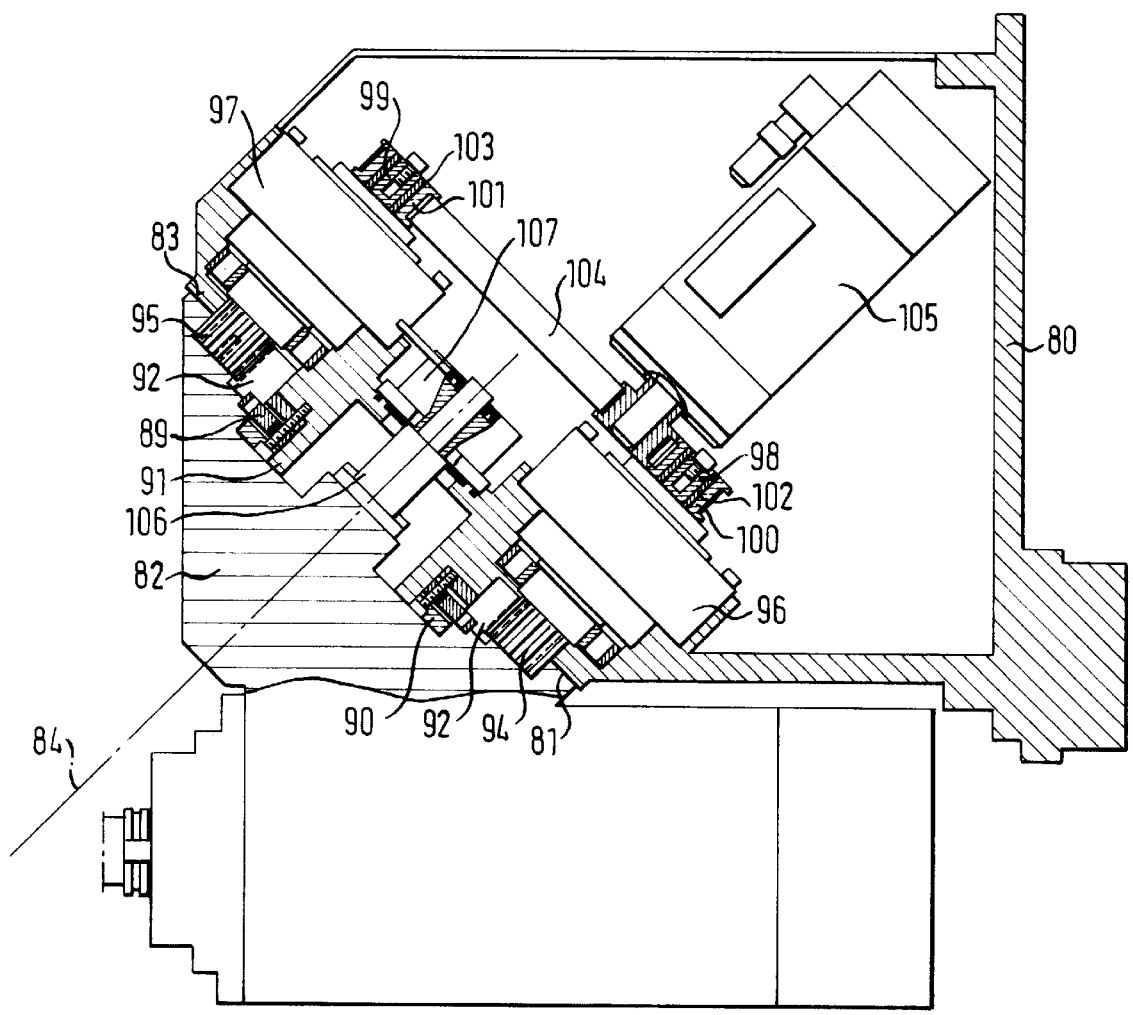
FIG. 7 is a sectional view of a swiveling milling head of the universal combined milling and boring machine illustrated in FIG. 6.

The universal milling and boring machine diagramed in FIG. 6 has supporting housing 80 that moves in the X and Z axes on a machine stand (not shown) with front end wall 81 inclined by 45° to the vertical and points obliquely downward, on which an NC swiveling milling head 82, having bearing surface 83 which is also inclined by 45° to the vertical, is mounted so it can rotate about pivot axis 84 (D axis) normal to end wall 81. Working spindle 85 is arranged at an angle of 45° to swivel axis 84 and is mounted in swivel milling head 82. Its drive is provided by a drive motor installed in the swivel milling head. By means of a swivel drive that is illustrated in FIG. 7 and explained in greater detail below, swivel milling head 82 can be pivoted continuously through a 180° range between one machining position (shown with solid lines in FIG. 6) where working spindle 85 is in a vertical position and another lower machining position (shown with dotted lines in FIG. 6) where working spindle 85 is in a horizontal position. The universal milling and boring machine illustrated here is also equipped with NC rotary table 86 that can be moved horizontally in the Y axis and has working table 88 that can rotate about vertical axis 87 (C axis).

As FIG. 7 shows, annular bearing surface 83 of swivel milling head 82 is in contact with end wall 81 of supporting housing 80 and is guided over an internal bearing disk 89. The internal bearing disk is securely attached at its radial outside area to swivel milling head 82 and its radial inside area is supported on annular shoulder 91 of supporting housing 80 over ring support 90 of two axial roller bearings and one radial roller bearing. Bearing disk 89 is arranged concentrically with swivel axis 84 on the radial inside of bearing surface 83. Annular gear 92 having external teeth 93 concentric with swivel axis 84 is attached to swivel milling head 82 between bearing surface 83 and bearing disk 89. The two output gears 94 and 95 of two cycloid gears 96 and 97 arranged in the interior of supporting housing 80 engage with outside teeth 93.

Figure 4:
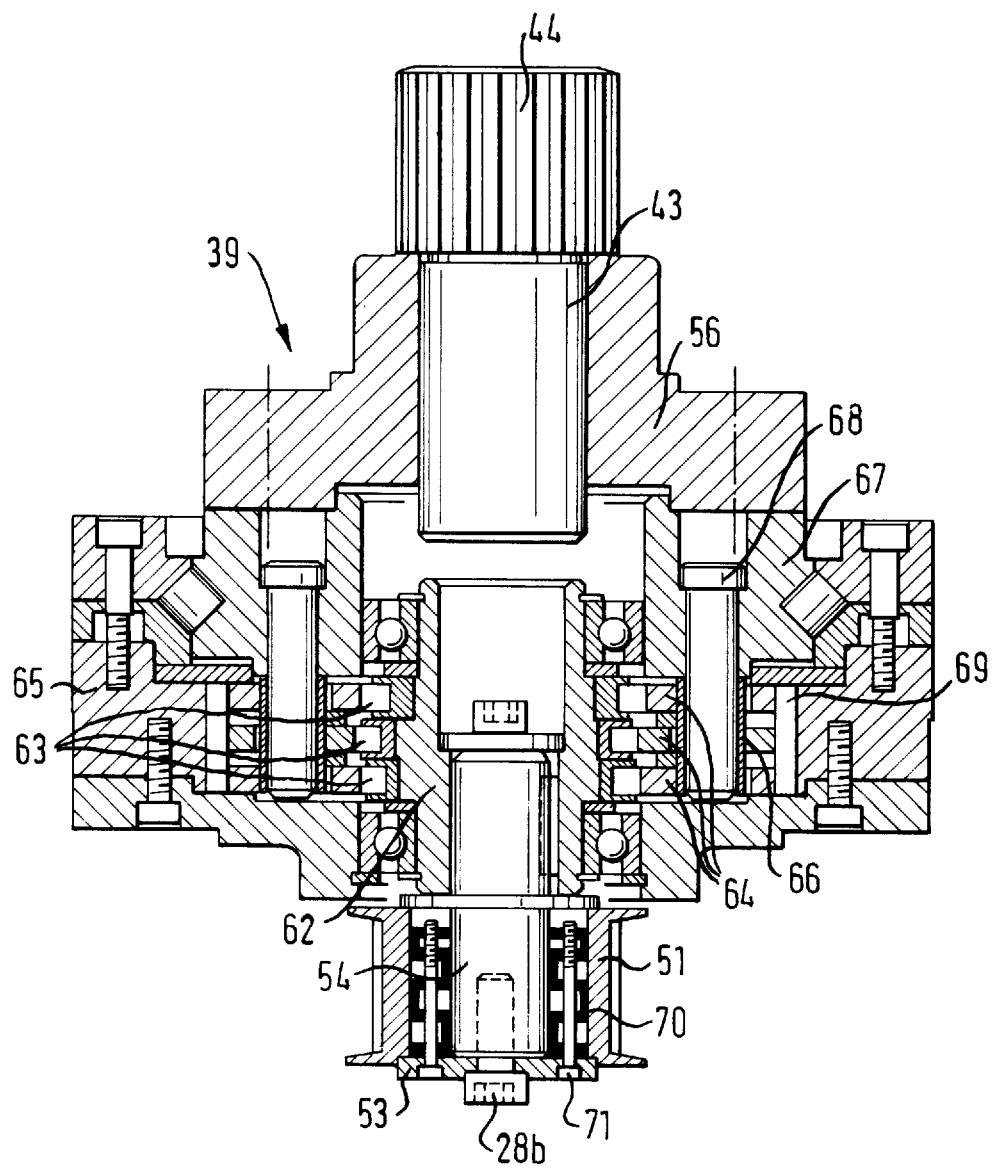
FIG. 4 is a sectional view of a cycloid gear employed in the present invention.

Cycloid gears 96 and 97 are configured similar to cycloid gear 39 illustrated in FIG. 4 and explained in detail above. With the actuator according to FIG. 7, driving pinions 100 and 101 are frictionally secured on drive shafts 98 and 99 of the respective cycloid gears 96 and 97 by means of adapter sleeves 102 and 103 that can be released. The two driving pinions 100 and 101 are driven in a program-controlled operation by drive motor 105 with common toothed belt 104.

A pin 106 that projects into the supporting housing is attached to swivel milling head 82 in such a way that it is coaxial with swivel axis 84, which is arranged with torsional strength in a hollow shaft of rotary position transducer 107 to detect the swivel position of swivel milling head 82.

Even with this swivel drive, it is possible to achieve a drive without play through a simple method of applying tension to the two gear trains. To do so, first the two adapter sleeves 102 and 103 must be released while toothed belt 104 is under tension and drive shafts 98 and 99 are rotated toward each other while driving pinions 100 and 101 remain stationary until the teeth of output gears 94 and 95 are in contact with the opposite tooth surfaces of annular gear 92. Then adapter sleeves 102 and 103 can be tightened again while retaining the initial tension.

FIG. 7 shows the two cycloid gears in a diametrically opposite arrangement. This is, however, just one possible embodiment. The two cycloid gears may also be arranged side by side, for example, on the upper or lower peripheral area of annular gear 92.

Using the drive assembly according to this invention as a swivel drive for a milling head permits continuous, numerically controlled rotation of the swivel milling head without play even during machining operations. Machine cutting can be performed in any position within the given swivel range. No complicated clamping devices are necessary to secure the swivel milling head in given machining positions. Together with the NC rotary table, simultaneous five-axis machining is possible with the universal milling and boring machine illustrated in FIG. 6, especially to perform complex and demanding machining jobs.

This invention is not limited to the embodiments illustrated here and described above, and instead it can also be used not only with rotary tables, swivel milling heads and forward feed carriages or movable stands for machine tools but also in all situations where components to be moved are to be driven with a high accuracy and rigidity in a small amount of space. Thus the drive assembly according to this invention can also be used to drive system parts, tool magazines, tool changers or for high-accuracy robot systems.

What is claimed is:

1. A drive assembly for relative movement of two components of a machine tool and including a component to be driven having engaging teeth thereon, said drive assembly comprising:

a drive motor;

a gear arrangement having two gear trains configured to be put under tension with respect to each other;

output gears on said gear trains configured to mesh with said teeth on said component to be driven;

a drive shaft with a compact cycloid gear thereon having a high transmission ratio on each said gear train;

at least one control element configured for putting tension on said two gear trains, said control element comprising releasable adapter sleeves;

a common toothed belt engaging and driving said cycloid gears; and driving pinions frictionally securable on said drive shafts by means of said adapter sleeves.

2. The drive assembly according to claim 1, and further comprising:

a swivelable housing;

a table top supported on said housing; and a gear wheel segment on said housing; wherein said output gears on said gear trains mesh with said gear wheel segment on said swivelable housing.

3. The drive assembly according to claim 1, and further comprising:

a table top mounted for rotation on said drive assembly; and an annular gear on said table top; wherein said output gears on said gear trains mesh with said annular gear for rotation of said table top.

4. The drive assembly according to claim 1, and further comprising:

a swivel milling head; and an annular gear mounted on said swivel milling head; wherein said output gears on said gear trains mesh with said annular gear on said swivel milling head.

5. The drive assembly according to one of claims 1 through 4, and further comprising a rotary position transducer mounted on and configured for detecting the angular position of said component to be driven.

6. A drive assembly for relative movement of two components of a machine tool and including a toothed rack having engaging teeth thereon, said drive assembly comprising:

a gear arrangement having two gear trains configured to be put under tension with respect to each other;

output gears on said gear trains configured to mesh with said teeth on said toothed rack;

a drive shaft and a compact cycloid gear thereon having a high transmission ratio on each said gear train;

a drive motor coupled to said cycloid gears by means of a common toothed belt;

at least one control element configured for applying tension to said two gear trains, said control element comprising releasable adapter sleeves; and driving pinions frictionally securable on said drive shafts by means of said adapter sleeves.

7. The drive assembly according to claim 6, wherein said drive motor and said cycloid gears are arranged on a component that is to be moved, and said toothed rack is arranged on a stationary component of said drive assembly.

8. The drive assembly according to claim 6, wherein said drive motor and said cycloid gears are arranged on a stationary component of said drive assembly, and said toothed rack is arranged on a component to be moved.

9. The drive assembly according to one of claims 6 through 8, and further comprising one receptacle element for insertion of a tool arranged on each of said drive shafts.

10. The drive assembly according to one of claims 6 through 8, wherein said cycloid gears each comprise a driving disk and has an output shaft that is supported on bearings, each said cycloid gear has a receptacle that is rotationally connected to its respective said driving disk and rotationally secures said output shaft.

* * * * *